US010787222B2

(12) United States Patent
Delvecchio et al.

(10) Patent No.: US 10,787,222 B2
(45) Date of Patent: Sep. 29, 2020

(54) SUSPENSION FOR A BICYCLE

(71) Applicant: HiRide Suspension S.r.l., Milan (IT)

(72) Inventors: Diego Delvecchio, Milan (IT);
Domenico Borgese, Milan (IT)

(73) Assignee: HIRIDE SUSPENSION S.r.L., Milan (IT)

( * ) Notice: Subject to any disclaimer, the term of this patent is extended or adjusted under 35 U.S.C. 154(b) by 49 days.

(21) Appl. No.: 16/344,037

(22) PCT Filed: Sep. 27, 2017

(86) PCT No.: PCT/IB2017/055907
§ 371 (c)(1),
(2) Date: Apr. 23, 2019

(87) PCT Pub. No.: WO2018/078464
PCT Pub. Date: May 3, 2018

(65) Prior Publication Data
US 2019/0248441 A1    Aug. 15, 2019

(30) Foreign Application Priority Data
Oct. 24, 2016   (IT) .................. 102016000106717

(51) Int. Cl.
*B62K 25/04* (2006.01)
*B62K 25/10* (2006.01)
(Continued)

(52) U.S. Cl.
CPC .............. *B62K 25/04* (2013.01); *B62K 25/08* (2013.01); *B62K 25/10* (2013.01); *F16F 9/46* (2013.01);
(Continued)

(58) Field of Classification Search
CPC ...... F16F 9/003; F16F 9/46; F16F 9/56; F16F 9/446; F16F 9/516; F16F 13/06;
(Continued)

(56) References Cited

U.S. PATENT DOCUMENTS 3,470,986 A    10/1969   Whisler
4,635,765 A *   1/1987   Schmidt .................... F16F 9/46
                                                            188/266.3

(Continued)

FOREIGN PATENT DOCUMENTS

CN           103307189 A      9/2013

OTHER PUBLICATIONS

International Search Report and Written Opinion in PCT/IB2017/055907 dated Jan. 2, 2018.

*Primary Examiner* — Robert A. Siconolfi
*Assistant Examiner* — San M Aung
(74) *Attorney, Agent, or Firm* — Manelli Selter PLLC; Edward Stemberger

(57) ABSTRACT

A suspension (1) for a bicycle (101) comprising an elastic element (2) and a blocking/releasing device (3) of the elastic element (2). The blocking/releasing device (3) comprises:—a closed hydraulic circuit (4) containing a working fluid (5);—a cylinder-piston assembly (60) comprising a cylinder (10) and a piston (6) slidable inside said cylinder, said cylinder-piston assembly (60) being inserted in the hydraulic circuit (4) and being operatively disposed in parallel with said elastic element;—a valve (8) commanded by an actuator (9) inserted in the hydraulic circuit (4) and configurable according to an open configuration, so that the working fluid (5) freely flows in the hydraulic circuit for enabling movements of the piston (6) inside the cylinder (10), and a closed configuration, so that the working fluid (5) is prevented from flowing in the hydraulic circuit (4) and the (Continued)

piston (6) is kept blocked by the working fluid (5);—a main housing (11) receiving inside the cylinder-piston assembly (60); wherein the hydraulic circuit (4) is made in a space formed between the walls of the main housing (11) and the walls of the cylinder (10).

10 Claims, 2 Drawing Sheets

(51) Int. Cl.
*F16F 9/46* (2006.01)
*F16F 9/56* (2006.01)
*B62K 25/08* (2006.01)
*F16F 13/06* (2006.01)
*F16F 13/00* (2006.01)

(52) U.S. Cl.
CPC ................ *F16F 9/56* (2013.01); *F16F 13/06* (2013.01); *B62K 2025/047* (2013.01); *B62K 2201/04* (2013.01); *F16F 13/007* (2013.01); *F16F 2230/0041* (2013.01); *F16F 2230/18* (2013.01)

(58) Field of Classification Search
CPC ................ F16F 13/007; F16F 2230/18; F16F 2230/0041; B62K 25/04; B62K 25/08; B62K 25/10; B62K 2201/04; B62K 2025/047
USPC ................... 267/219, 221; 188/266
See application file for complete search history.

(56) References Cited

U.S. PATENT DOCUMENTS

| | | | |
|---|---|---|---|
| 5,275,264 A * | 1/1994 | Isella | F16F 9/464 188/299.1 |
| 6,119,831 A * | 9/2000 | Knecht | F16F 9/46 188/282.2 |
| 2005/0104320 A1* | 5/2005 | Wesling | F16F 9/446 280/276 |
| 2011/0012317 A1 | 1/2011 | Mouri | |
| 2011/0127706 A1 | 6/2011 | Sims et al. | |
| 2012/0049427 A1 | 3/2012 | Hsu | |

* cited by examiner

SUSPENSION FOR A BICYCLE

TECHNICAL FIELD OF THE INVENTION

It is an object of the present invention a suspension for a bicycle, particularly a suspension for a racing bicycle.

Prior Art

Referring particularly to the field of the racing bicycles, it is known to provide the bicycles with adjustable suspensions. Generally, in the race field, it would be desiderable to obtain a setup which is as stiff as possible. However, in case of an uneven terrain, it is required to modulate the stiffness of the bicycle attitude so that this latter is capable of absorbing them, by reducing the vibrations transmitted to the cyclist. Therefore, it is known to provide front and/or rear suspensions comprising an elastic spring and an adjustable damper, in order to adapt the behavior of the bicycle itself to the conditions of a terrain.

SUMMARY OF THE INVENTION

It is an object of the present invention to provide a suspension for a bicycle, particularly a suspension for a racing bicycle, which enables to modify the attitude of the bicycle itself, particularly which enables to switch from a stiff structure to an elastic structure and viceversa, and which is structurally simple.

This and other objects are obtained by a suspension according to claim 1.

BRIEF DESCRIPTION OF THE FIGURES

For a better comprehension of the invention and for appreciating the advantages thereof, some exemplifying non-limiting embodiments thereof will be described in the following with reference to the attached figures, wherein.

DETAILED DESCRIPTION OF THE INVENTION

Figure 1:
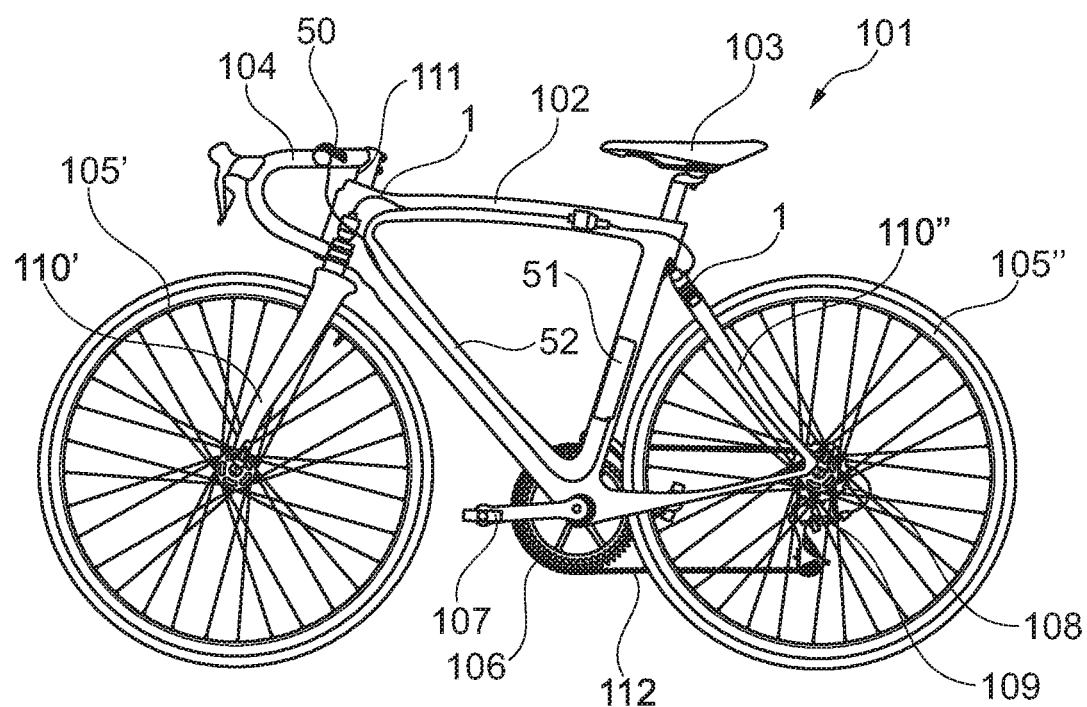
FIG. 1 is a partially phantom lateral schematic view of a bicycle.

With reference to the attached drawings, FIG. 1 schematically shows a bicycle, indicated by the reference 101. The bicycle 101 comprises a frame 102, a saddle 103, and a handlebar 104. Moreover, the bicycle 1 comprises a first 105' and second wheels 105" associated to the frame 102. For example, the first wheel 105' is the front wheel, and the second wheel 105" is the rear wheel, with reference to the conventional direction of advancement of the bicycle itself.

The bicycle 1 comprises a pedaling group 106, provided with pedals 107 mechanically coupled to one of the wheels 105' or 105", for example to the rear wheel 105", by a chain 112. At such mechanical coupling, a free-wheel mechanism 108 and possibly a shifter 109 can be provided.

The frame 102 is connected to a front fork 110' which supports the front wheel 105', and to a rear fork 110" which supports the rear wheel 105". A suspension 1 according to the invention is interposed between the frame 102 and the front fork 110', and/or between the frame 102 and the rear fork 110". When the suspension 1 is positioned at the front, this can be, particularly, connected to the steering column 111, connected to the handlebar 104, rotatively in a frame portion.

Figure 2:
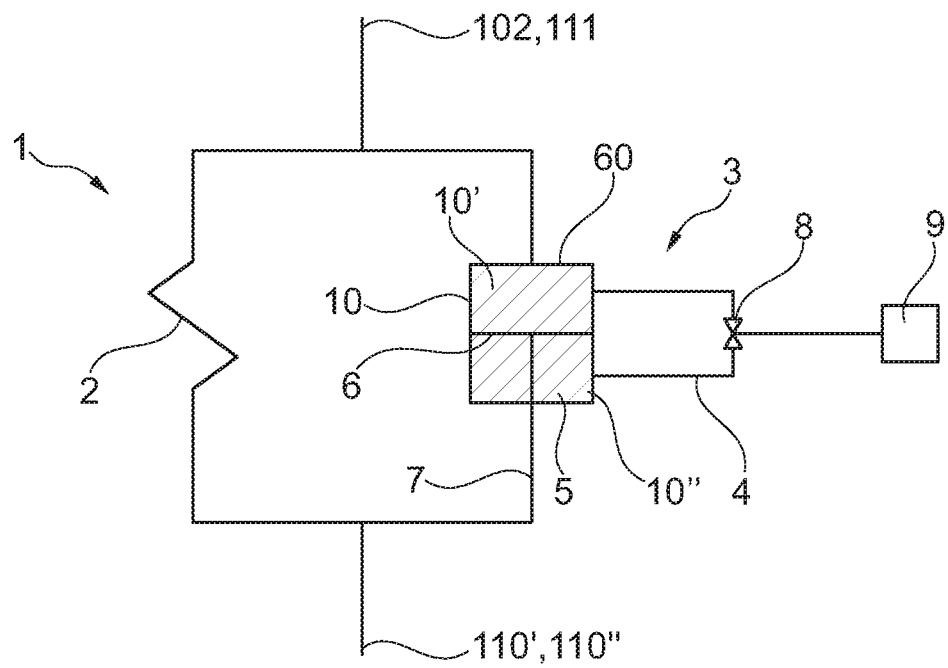
FIG. 2 is a schematic illustration of the operative principle of the suspension according to the invention.

With reference to FIG. 2, it shows an illustration of the operative outline of the suspension 1 according to the invention.

The suspension 1 comprises an elastic element 2, which is for example a coil spring or an elastic body of a different type. Moreover, the suspension 1 comprises a blocking/releasing device 3 capable of interacting, with modes which will be described in the following, with the elastic element 2 such that this latter is substantially free of deforming (obtaining in this way the suspending function), or, as an alternative, so that this is substantially blocked, in other words acts as a substantially stiff body.

For this reason, the blocking/releasing device 3 comprises a closed hydraulic circuit 4 containing a working fluid 5, for example an oil. The hydraulic circuit 4 receives a hydraulic cylinder-piston group 60, comprising a cylinder 10 and a hydraulic piston 6, movable inside the cylinder 10, provided with a stem 7, particularly a double-acting piston, immersed in the working fluid 5, which divides the hydraulic circuit in two portions.

The cylinder-piston assembly 60 is operatively disposed parallel to the elastic element 2. Specifically, the cylinder 10 is operatively connected to an end of the elastic element 2, while the piston 6, for example by means of the stem 7 thereof, is operatively connected to the opposite end of the elastic element 2. In order to obtain such operative configuration, for example, the stem 7 of the piston 6 and an end of the elastic element 2 can be connected to the front 100' or rear 110" fork, while the cylinder 10 slidably receiving the piston 6 and the other end of the elastic element 2 can be connected to the frame 102 or to the steering column 111 (or viceversa). The piston 6 divides the chamber delimited by the cylinder 10 into a first chamber 10' and into a second chamber 10, the volumes thereof vary due to the effect of the movements of the piston 6 itself.

Moreover, the hydraulic circuit 4 receives a valve 8 commanded by an actuator 9, for example an electric motor. The valve 8 can take two configurations: an open configuration and a closed configuration. When the valve 8 is in the open configuration, the working fluid 5 freely slides inside the hydraulic circuit, particularly freely moves between the chamber 10' and 10" of the cylinder 10. Therefore, due to the effect of the oscillations of the elastic element 2 under an operative condition of the suspension 1, the piston 6 will oscillate with it inside the cylinder 10 and the oscillations of the piston 6 are matched by fluid transfers through the open valve 8 between the first chamber 10' and second chamber 10", whose volumes will inversely change, in other words as the volume of a chamber increases, the volume of the other chamber will decrease.

Instead, when the valve 8 is in the closed configuration, the two portions of the hydraulic circuit, respectively between the first chamber 101' and the valve 8, and between the second chamber 102" and the valve 8, do not communicate anymore with each other, and therefore the working fluid exchange between the first chamber 10' and second chamber 10" is no more possible. Therefore, due to the substantial incompressibility of the working fluid 5, the piston 6 remains blocked by the working fluid in the two circuit portions in the position wherein it was when the valve 8 was closed. Since the piston 6 is operatively connected to the elastic element 2, which is in turn connected, with the said modes, also to the cylinder 10 slidably receiving the piston 6, the elastic element 2 is blocked and therefore the suspension is substantially stiff.

Figure 3:
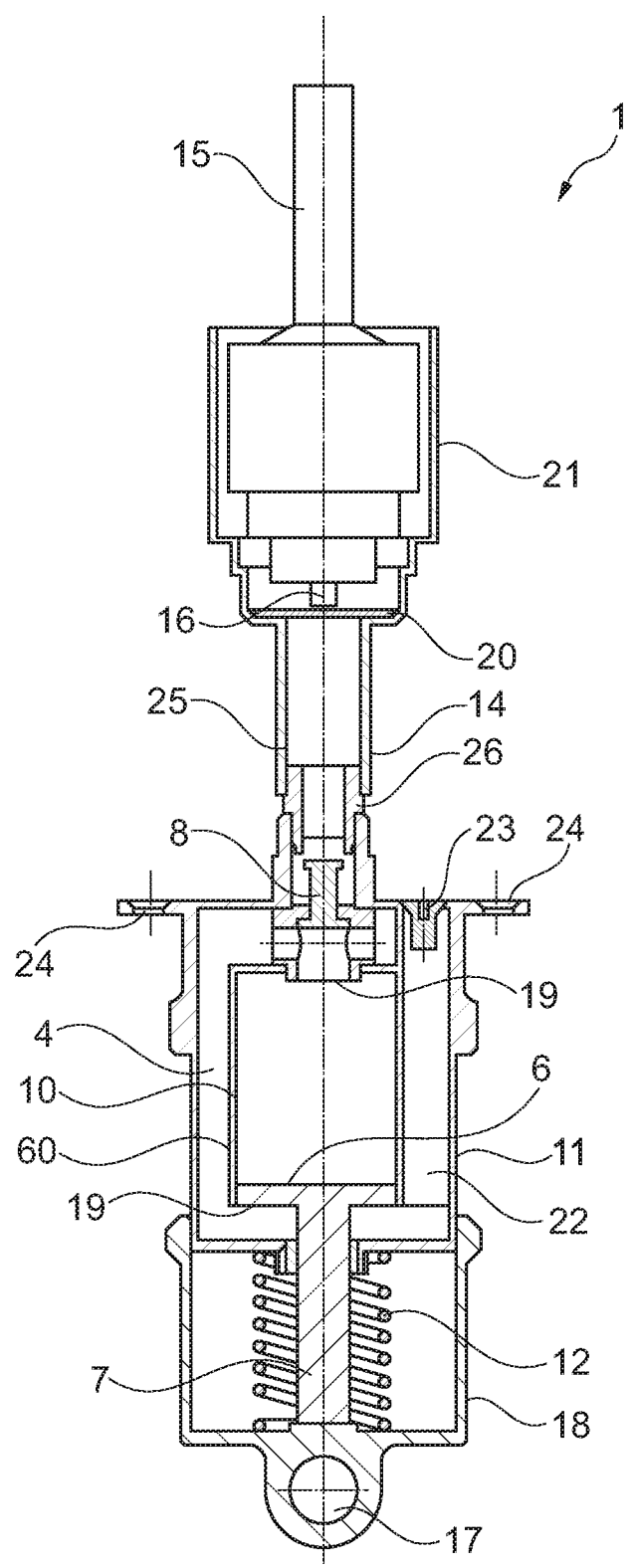
FIG. 3 is a cross-section view of a suspension according to a possible embodiment of the invention.

With reference to FIG. 3, it shows a constructive approach, which implements the configuration in FIG. 2, of the suspension 1 according to a possible embodiment of the invention. The suspension 1 can comprise a main housing 11 connectable, for example by connecting holes 24, to the frame 102 or to the steering column 111, and coupled to the elastomeric body or spring 12 which implements the beforehand cited elastic element 2. The main housing 11 receives inside the cylinder-piston assembly 60, particularly the cylinder 10, and is further fixed to a top end of the elastomeric body or spring 12, for implementing the beforehand cited operative coupling of the cylinder 10 to an end of the elastic element 2.

The stem 7 of the piston 6 exits the cylinder 10 and the main housing 11, and is connected to the elastomeric body or spring 12 by an end opposite to the end wherein the connection to the main housing 11 is provided. For this reason, for example, the suspension 1 can comprise an auxiliary chamber 18 receiving inside the elastomeric body or spring 12, slidable with respect to the main hosing 11 and integral with the stem 7 of the piston 6. The elastomeric body or spring 12 is such to oppose, due to the effect of its elastic deformations, the movements of the auxiliary chamber 18 towards the main housing 11. The auxiliary chamber 18 can be connected to the bicycle fork by a slit 17. In this way, it is implemented the beforehand described operative connection between the piston 6 and elastic element 2 formed by the elastomeric body 12. According to this arrangement, the relative movements of the auxiliary chamber 18 on the main housing 11 are translated in deformations of the elastomeric body or spring 12, and in movements of the piston 6 inside the chamber 10.

Advantageously, the hydraulic circuit 4 is made in a space formed between the walls of the main housing 11 and the walls of the cylinder 10. These latter exhibits openings 19 enabling the communication between the first 10' and second chambers 10" with the suitably configured hydraulic circuit 4. According to the exemplifying embodiment in FIG. 3, the valve 8 can be housed above the cylinder 10 between the walls of this latter, and of the main housing 11.

Preferably, the valve 8 is actuated by an electric motor 15 communicating with the valve 8 itself by means of a hydraulic transmission 14 receiving inside a working fluid, which can be the same as the working fluid contained in the hydraulic circuit 4, or another fluid. For example, the electric motor 15 can comprise a shaft 16 capable of translating between a retracted position and an extended position. Each position of the shaft 16 is matched by a position of the valve 8, which is actuated by the working fluid contained in the hydraulic transmission 14, pressurized and moved by the shaft 16 of the electric motor 15 preferably by a membrane 20. The electric motor 15 and membrane 20 can be housed in a motor housing 21 connected to the hydraulic transmission 14.

According to a possible embodiment, the hydraulic transmission 14 comprises a rigid tube 25, for example made of metal, preferably formed by the motor housing 21, connected to the seat of the valve 8 by a connecting element 26, for example.

According to a possible embodiment, the hydraulic circuit 4 comprises a balancing chamber 22, also preferably made in a space between the walls of the main housing 11 and the walls of the cylinder 10, and a valve 23, preferably positioned in a wall of the main housing 11. The purpose of the balancing chamber is to balance the overall volume increase inside the cylinder 10 due to the piston entering inside it. The valve 23 enables to purge and fill the fluid present in the cylinder 10.

Opening and closing the valve 8 and therefore blocking and releasing the suspension, can be manually or automatically commanded. In the first case, it is provided a control board 50 (FIG. 1), for example locatable on the handlebar 104, by means of it, the cyclist, for example by acting on pushbuttons, commands to block or release the suspension. In the second case, it is provided a control unit connected to sensors positioned on the bicycle and/or cyclist, for example accelerometers and/or gyroscopes capable of supplying measurements indicating the level of the terrain unevenness on which the bicycle is running on, and/or the dynamics of the bicycle and/or cyclist, as a function of them, the control unit automatically opens and closes the valve, consequently the suspension is released or blocked. According to a further variant, the control unit can be, preferably wirelessly, connected to further sensors, such as a GPS sensor, a power meter, a cardio frequency meter, a pedal thrust cadence sensor.

In order to be sure of electrically supplying the described components, it is further provided a battery pack 51 connected to the suspension 1 itself and also to the control board 50. Preferably, the battery pack 51 and/or wires 52 for connecting the battery pack 51 to the suspension 1 and to the control board 50 are at least partially housed inside the frame, which preferably comprises tubular bodies.

To the described embodiments of the suspension according to the invention, the person skilled in the art, in order to satisfy contingent specific needs, can introduce several additions, modifications, or substitutions of the elements with other operatively equivalent, without however falling out of the scope of the attached claims.

The invention claimed is:

1. Suspension for a bicycle comprising an elastic element and a blocking/releasing device of the elastic element, wherein the blocking/releasing device comprises:
   a closed hydraulic circuit containing a working fluid;
   a cylinder-piston assembly comprising a cylinder and a piston slidable in said cylinder, said cylinder-piston assembly being inserted in the hydraulic circuit and being disposed operatively in parallel to said elastic element;
   a valve commanded by an actuator inserted in the hydraulic circuit and configurable according to an open configuration, such that the working fluid freely flows in the hydraulic circuit for enabling movements of the piston inside the cylinder, and a closed configuration, such that the working fluid is prevented from flowing in the hydraulic circuit and the piston is kept blocked by the working fluid; and
   a main housing receiving inside the cylinder-piston assembly,
   wherein the hydraulic circuit is made in a space formed between walls of the main housing and walls of the cylinder.

2. Suspension according to claim 1, wherein said cylinder is operatively connected to an end of the elastic element and said piston is connected to an opposite end of the elastic element.

3. Suspension according to claim 1, wherein said piston is a double-acting piston.

4. Suspension according to claim 1, wherein said piston divides the cylinder in a first and in a second chambers having a volume varying as a function of the position of the piston, wherein, when the valve is in the open configuration, the working fluid flows due to the movements of the piston between said first and second chambers through the valve in the hydraulic circuit and, when the valve is in the closed configuration, the transfer of the working fluid between the first and second chambers is prevented, thereby blocking the piston.

5. Suspension according to claim 1, wherein said elastic element comprises an elastomeric body or a spring.

6. Suspension according to claim 5, wherein said main housing is coupled to said elastic element on a first side of the latter, wherein the piston comprises a stem projecting from the cylinder and from the main housing and is connected to the elastic element on a second side of the latter opposite to the first one.

7. Suspension according to claim 6, comprising an auxiliary chamber receiving inside the elastic element, said auxiliary chamber being slidable with respect to the main housing and integral with the stem of the piston, said elastic element being positioned so to counter, by elastically deforming, approaching movements of the auxiliary chamber towards the main housing.

8. Suspension according to claim 1, wherein the hydraulic circuit comprises a balancing chamber and a valve.

9. Suspension according to claim 1, wherein said actuator comprises an electric motor communicating with the valve by a hydraulic transmission, said electric motor comprising a linearly movable shaft acting on said hydraulic transmission by a membrane fluidically separating the electric motor from the hydraulic transmission.

10. Bicycle comprising a suspension according to claim 1.

\* \* \* \* \*